United States Patent
Hallack et al.

(10) Patent No.: US 9,963,075 B2
(45) Date of Patent: May 8, 2018

(54) TOGGLE MECHANISM FOR REARVIEW ASSEMBLY

(71) Applicant: Gentex Corporation, Zeeland, MI (US)

(72) Inventors: Jason D. Hallack, Allendale, MI (US); Ulrich A. Kuester, Spring Lake, MI (US)

(73) Assignee: GENTEX CORPORATION, Zeeland, MI (US)

( * ) Notice: Subject to any disclaimer, the term of this patent is extended or adjusted under 35 U.S.C. 154(b) by 35 days.

(21) Appl. No.: 15/255,717

(22) Filed: Sep. 2, 2016

(65) Prior Publication Data
US 2017/0080867 A1    Mar. 23, 2017

Related U.S. Application Data

(60) Provisional application No. 62/220,393, filed on Sep. 18, 2015, provisional application No. 62/349,407, filed on Jun. 13, 2016.

(51) Int. Cl.
| | |
|---|---|
| *B60R 1/12* | (2006.01) |
| *B60R 1/04* | (2006.01) |
| *G02B 5/00* | (2006.01) |
| *G02B 27/14* | (2006.01) |
| *G02B 5/08* | (2006.01) |

(Continued)

(52) U.S. Cl.
CPC ............. *B60R 1/12* (2013.01); *B60R 1/04* (2013.01); *G02B 5/08* (2013.01); *G02B 7/182* (2013.01); *G02B 27/144* (2013.01); *B60R 2001/1215* (2013.01); *B60R 2001/1253* (2013.01);

(Continued)

(58) Field of Classification Search
CPC ... G02B 5/04; G02B 5/08; G02B 7/18; G02B 7/182; G02B 27/14; G02B 27/144; G02F 1/15; G09G 3/38; B60R 1/04; B60R 1/06; B60R 1/072; B60R 1/08; B60R 1/086; B60R 1/12; B60R 2001/1215; B60R 2001/1253; B60R 2011/0033
USPC ....... 359/265, 267, 275, 629, 632, 838, 841, 359/843, 871–873, 876; 362/135, 136, 362/494; 248/479, 481, 484, 486; 345/105
See application file for complete search history.

(56) References Cited

U.S. PATENT DOCUMENTS

| | | | |
|---|---|---|---|
| 4,158,483 A | * | 6/1979 | Fisher .................... B60R 1/072 359/876 |
| 4,435,042 A | | 3/1984 | Wood et al. |

(Continued)

OTHER PUBLICATIONS

International Search Report and Written Opinion of the International Searching Authority, or the Declaration, dated Dec. 15, 2016, for International Application No. PCT/US2026/050056, filed on Sep. 2, 2016, 8 pages.

*Primary Examiner* — Loha Ben
(74) *Attorney, Agent, or Firm* — Price Heneveld LLP; Bradley D. Johnson

(57) ABSTRACT

An actuator assembly configured to adjust a viewing axis of a vehicle mirror is disclosed. The assembly comprises a toggle switch and a pivot plate rotationally coupled to the toggle switch proximate a first axis. The assembly further comprises a support bracket rotationally coupled to the pivot plate along a second axis and rotationally coupled to the toggle switch along the first axis. The support bracket is configured to support the vehicle mirror, and a rotation of the toggle switch is configured to move the pivot plate relative to the support bracket.

20 Claims, 13 Drawing Sheets

(51) Int. Cl.
*G02B 7/182* (2006.01)
*G02B 5/04* (2006.01)
*B60R 11/00* (2006.01)
*G02F 1/15* (2006.01)

(52) U.S. Cl.
CPC ......... *B60R 2011/0033* (2013.01); *G02B 5/04* (2013.01); *G02B 27/14* (2013.01); *G02F 1/15* (2013.01)

(56) References Cited

U.S. PATENT DOCUMENTS

| | | | | |
|---|---|---|---|---|
| 4,913,543 A * | 4/1990 | Haba | | B60R 1/066 248/480 |
| 5,327,288 A * | 7/1994 | Wellington | | B60R 1/086 248/479 |
| 6,254,242 B1 * | 7/2001 | Henion | | B60R 1/072 359/872 |
| 6,264,338 B1 * | 7/2001 | MacFarland | | B60R 1/06 359/838 |
| 6,329,925 B1 * | 12/2001 | Skiver | | B60R 1/12 340/425.5 |
| 6,474,822 B2 * | 11/2002 | Swindon | | B60R 1/072 359/871 |
| 6,598,980 B2 | 7/2003 | Marusawa et al. | | |
| 6,779,901 B2 * | 8/2004 | Swindon | | B60R 1/072 359/871 |
| 7,249,860 B2 * | 7/2007 | Kulas | | B60R 1/04 359/604 |
| 7,568,810 B2 * | 8/2009 | Kulas | | B60R 1/04 359/604 |
| 8,201,800 B2 * | 6/2012 | Filipiak | | B60R 1/04 248/483 |
| 8,646,924 B2 * | 2/2014 | Roth | | B60R 1/04 359/872 |
| 8,814,373 B2 * | 8/2014 | Steel | | B60R 1/12 359/871 |

* cited by examiner

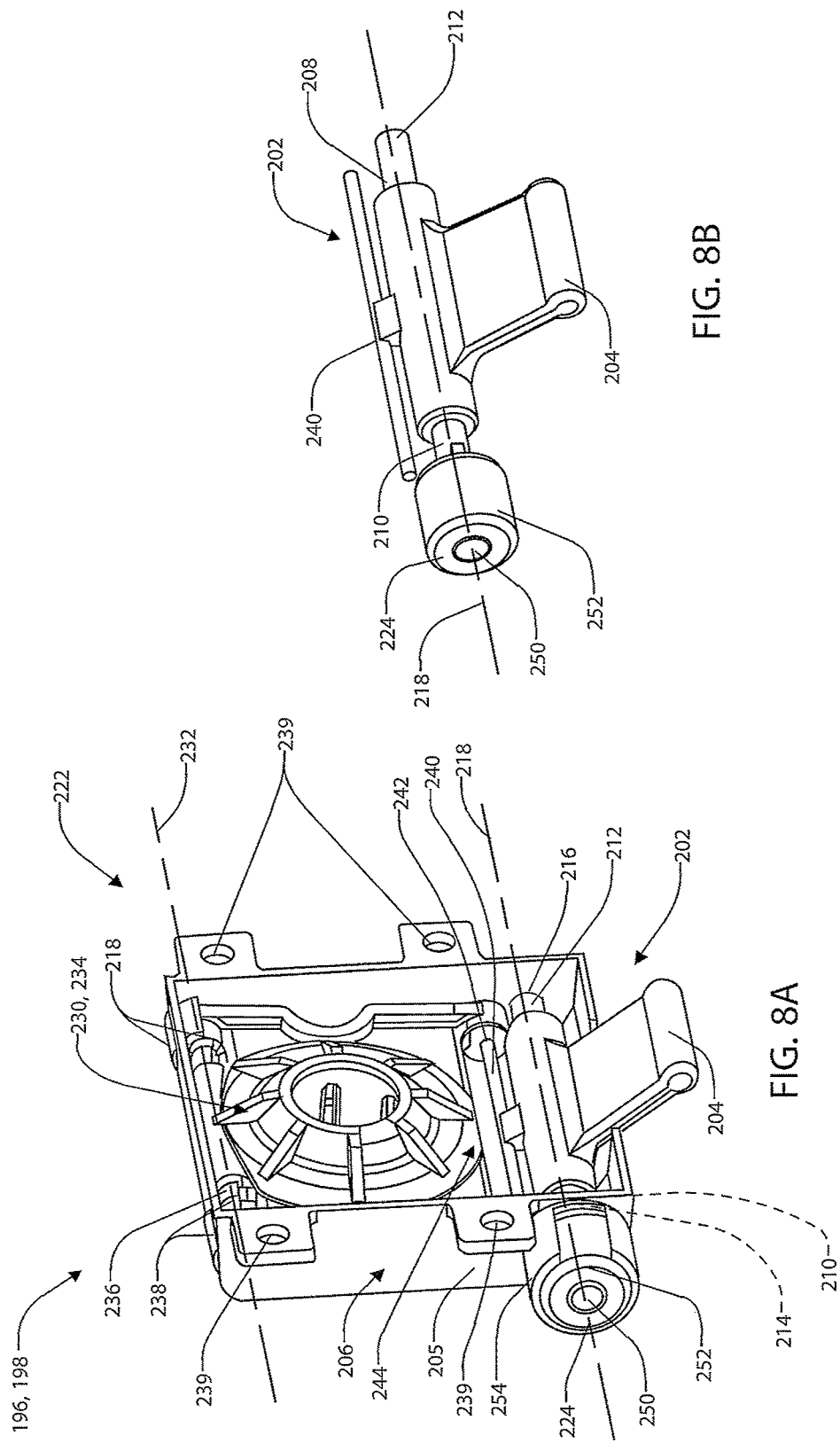

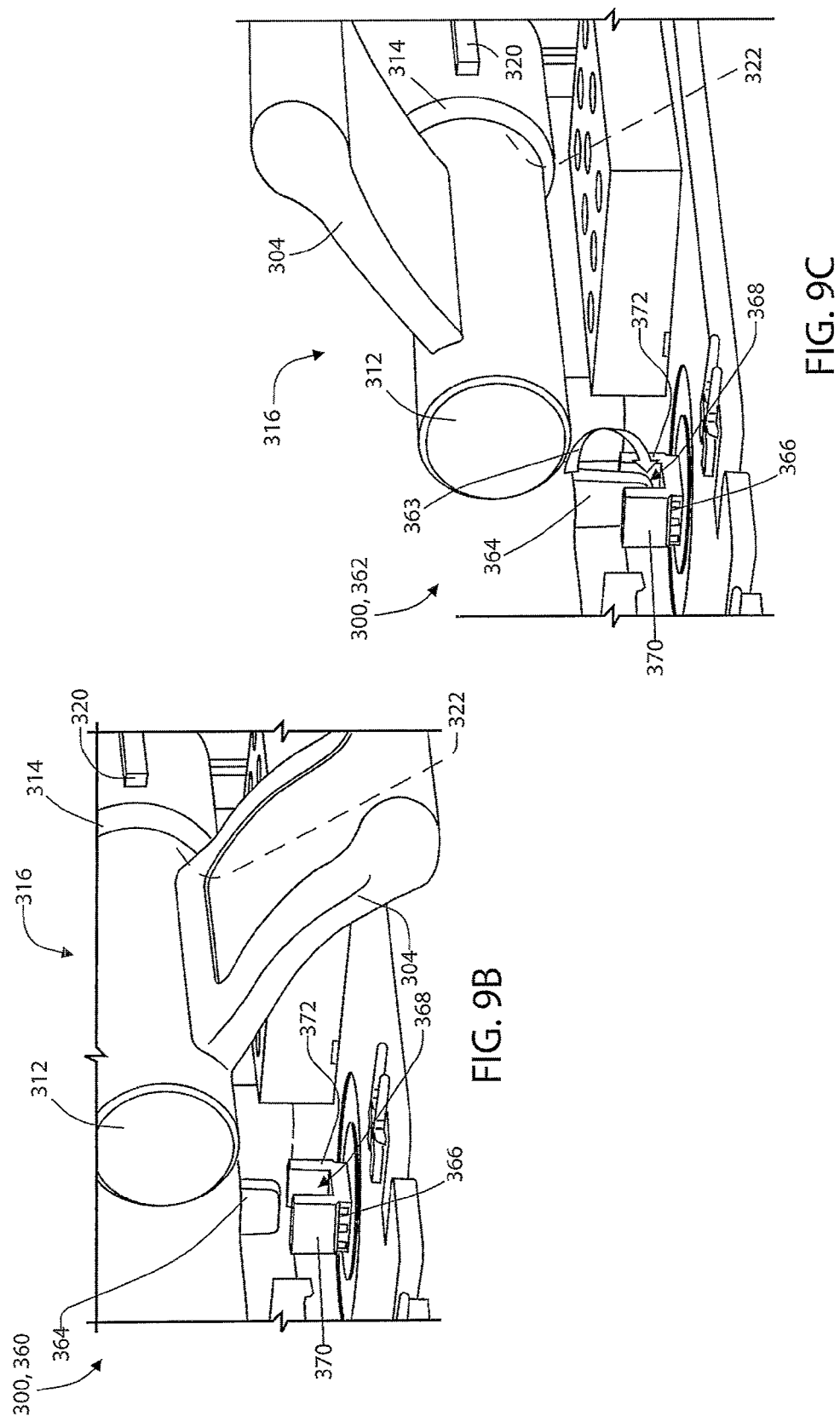

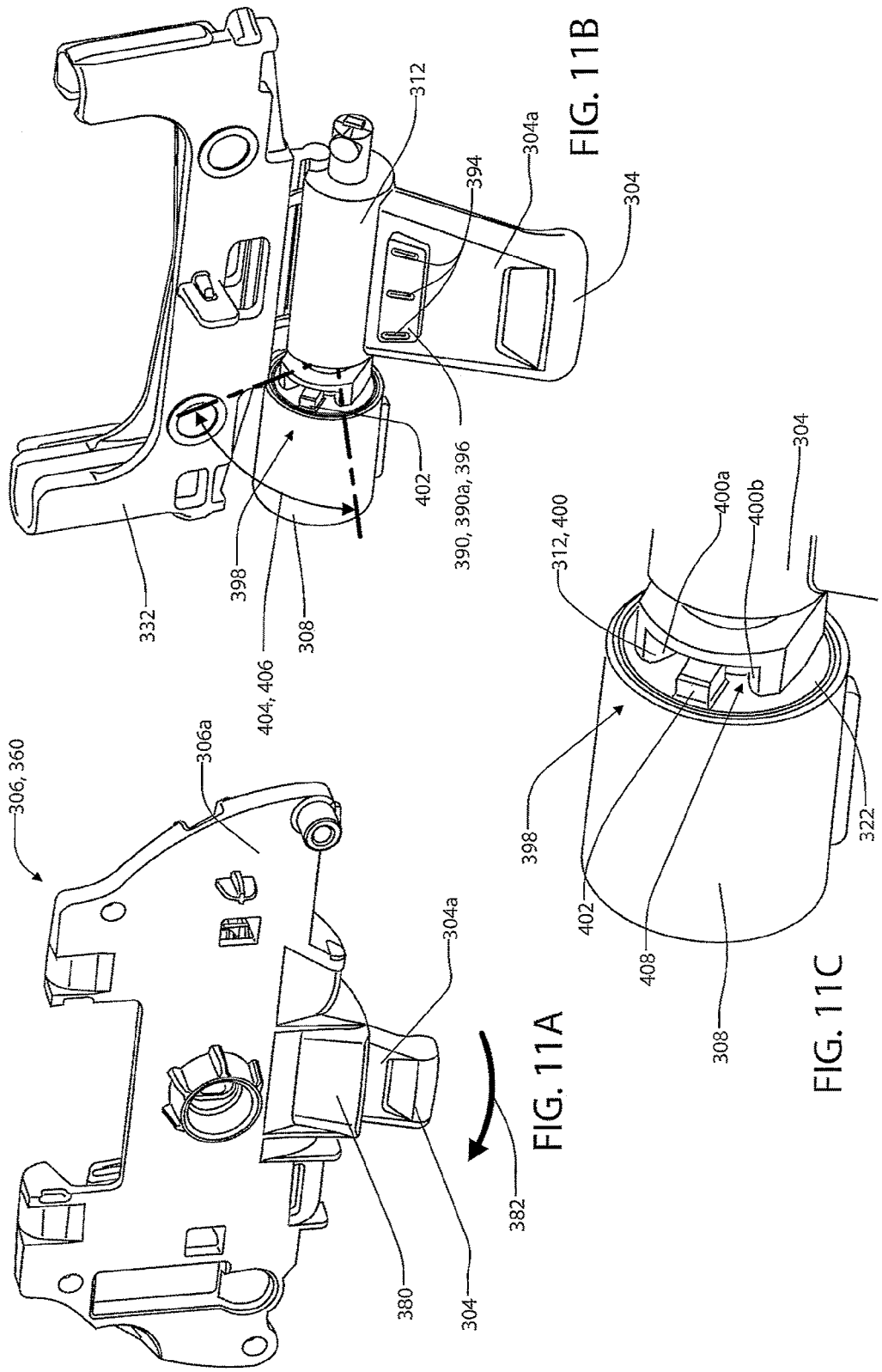

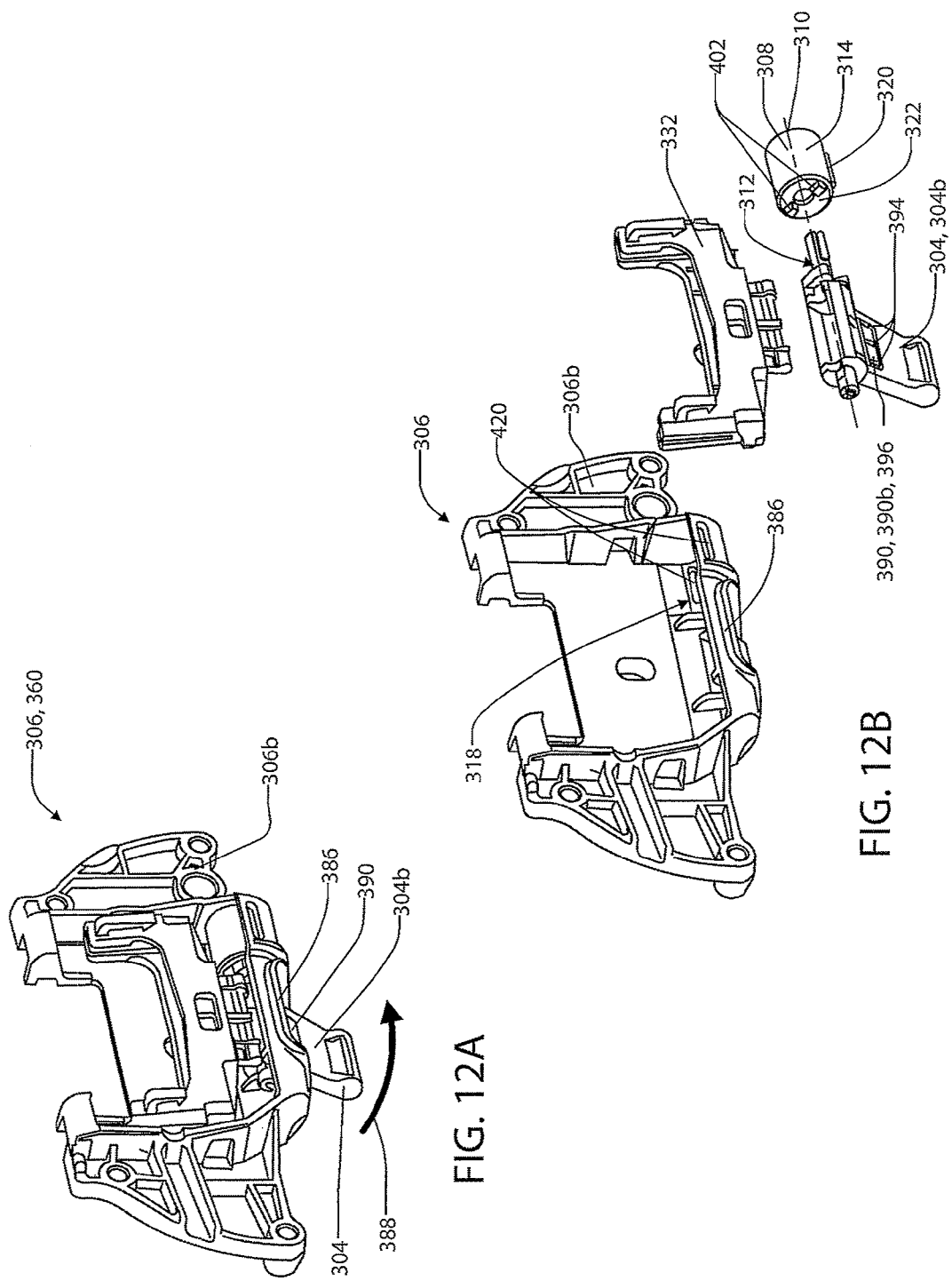

TOGGLE MECHANISM FOR REARVIEW ASSEMBLY

CROSS-REFERENCE TO RELATED APPLICATIONS

This application claims priority to U.S. Provisional Patent Application No. 62/220,393, filed on Sep. 18, 2015, entitled "DISPLAY MIRROR ASSEMBLY WITH TOGGLE DAMPER," and U.S. Provisional Patent Application No. 62/349,407, filed on Jun. 13, 2016, entitled "TOGGLE MECHANISM FOR REARVIEW ASSEMBLY," the disclosures of which are hereby incorporated herein by reference in their entireties.

TECHNOLOGICAL FIELD

The present invention generally relates to a rearview device system, and more particularly, a display mirror assembly having a partially reflective, partially transmissive element and a display behind the reflective element.

SUMMARY OF THE INVENTION

In one aspect, the disclosure provides for an actuator assembly configured to adjust a viewing axis of a vehicle mirror. The assembly comprises a toggle switch and a pivot plate rotationally coupled to the toggle switch proximate a first axis. The assembly further comprises a support bracket rotationally coupled to the pivot plate along a second axis and rotationally coupled to the toggle switch along the first axis. The support bracket is configured to support the vehicle mirror, and a rotation of the toggle switch is configured to move the pivot plate relative to the support bracket to adjust a viewing angle of the vehicle mirror.

In another aspect, the disclosure provides for a mirror assembly for a vehicle. The assembly comprises a housing and a glass element operably coupled with the housing. An actuator device is disposed in connection with the housing and operably coupled with the glass element. The actuator device is adjustable to tilt the glass element to a first position and a second position. A damper is in engagement with the actuator device and the housing. The damper controls a movement of the actuator device corresponding to the movement of the glass element from the first position to the second position.

In yet another aspect, the disclosure provides for a mirror assembly for a vehicle. The assembly comprises a support bracket and a glass element operably coupled with the support bracket. An actuator assembly is disposed in connection with the support bracket, which is adjustable to tilt the glass element to a first position and to a second position. A damper is in engagement with the actuator assembly and the support bracket over a first portion of an actuation range. The damper controls a movement of the actuator assembly corresponding to the movement of the glass element from the first position to the second position. The assembly further comprises a sensor configured to detect a position of the actuator assembly.

These and other features, advantages, and objects of the present invention will be further understood and appreciated by those skilled in the art by reference to the following specification, claims, and appended drawings.

BRIEF DESCRIPTION OF THE DRAWINGS

FIG. 8A is a perspective view of an actuator assembly for the display mirror;

FIG. 8B is a perspective view of a toggle mechanism of the actuator assembly;

FIG. 9B is a projected view of a partial assembly of the actuator assembly demonstrated in FIG. 9A;

FIG. 9C is a projected view of a partial assembly of the actuator assembly demonstrated in FIG. 9A;

FIG. 11A is a projected view of a partial assembly of the actuator assembly in accordance with the disclosure;

FIG. 11B is a projected view of a partial assembly of the actuator assembly in accordance with the disclosure;

FIG. 11C is a detailed projected view of the actuator assembly in accordance with the disclosure;

FIG. 12A is a projected view of a partial assembly of the actuator assembly in accordance with the disclosure; and FIG. 12B is an exploded view of the actuator assembly in accordance with the disclosure.

DETAILED DESCRIPTION

Figure 1:
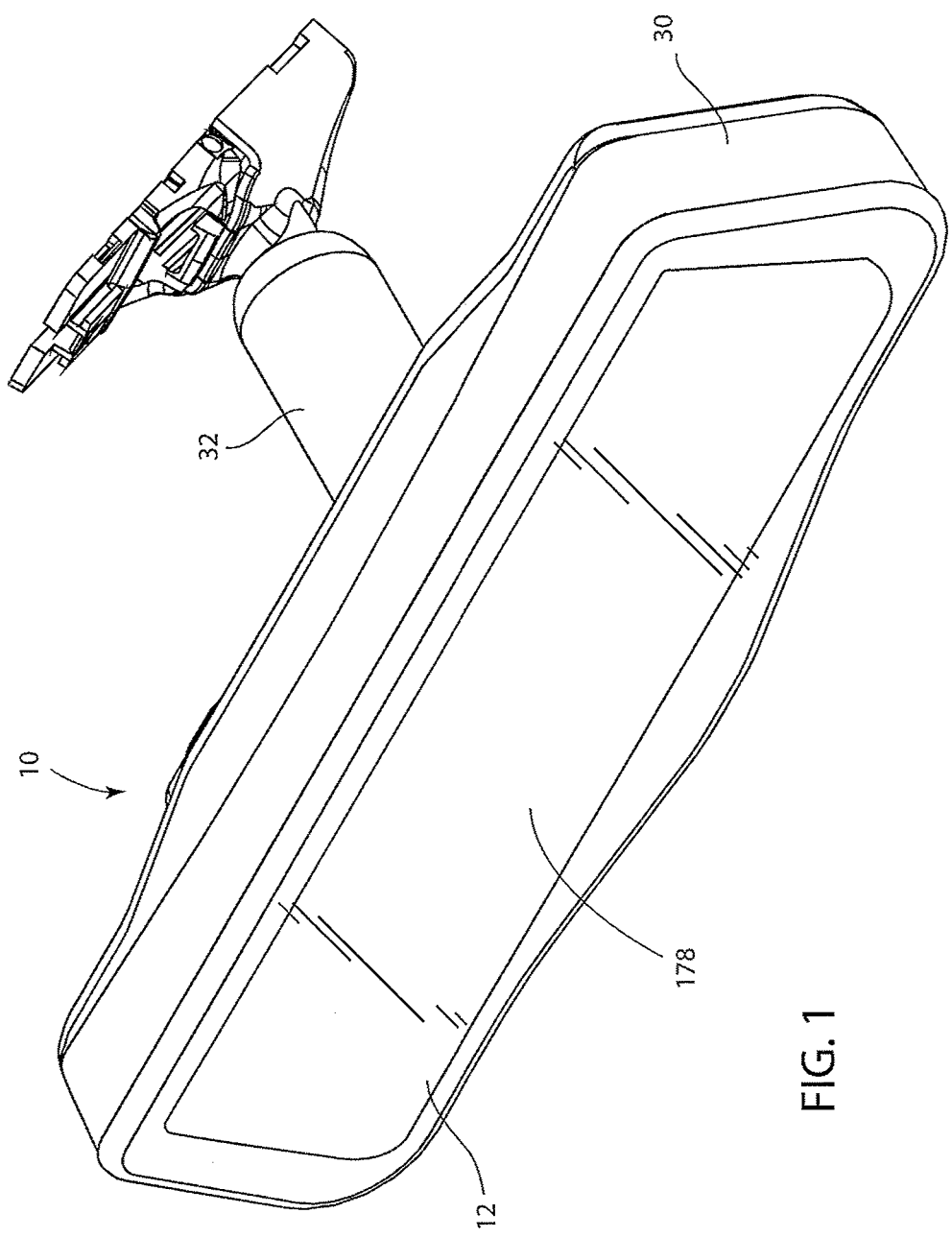
FIG. 1 is a top front perspective view of a display mirror assembly for a vehicle.

The present illustrated embodiments reside primarily in combinations of method steps and apparatus components related to a display mirror. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of the display mirror, and the term "rear" shall refer to the surface of the element further from the intended viewer of the display mirror. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
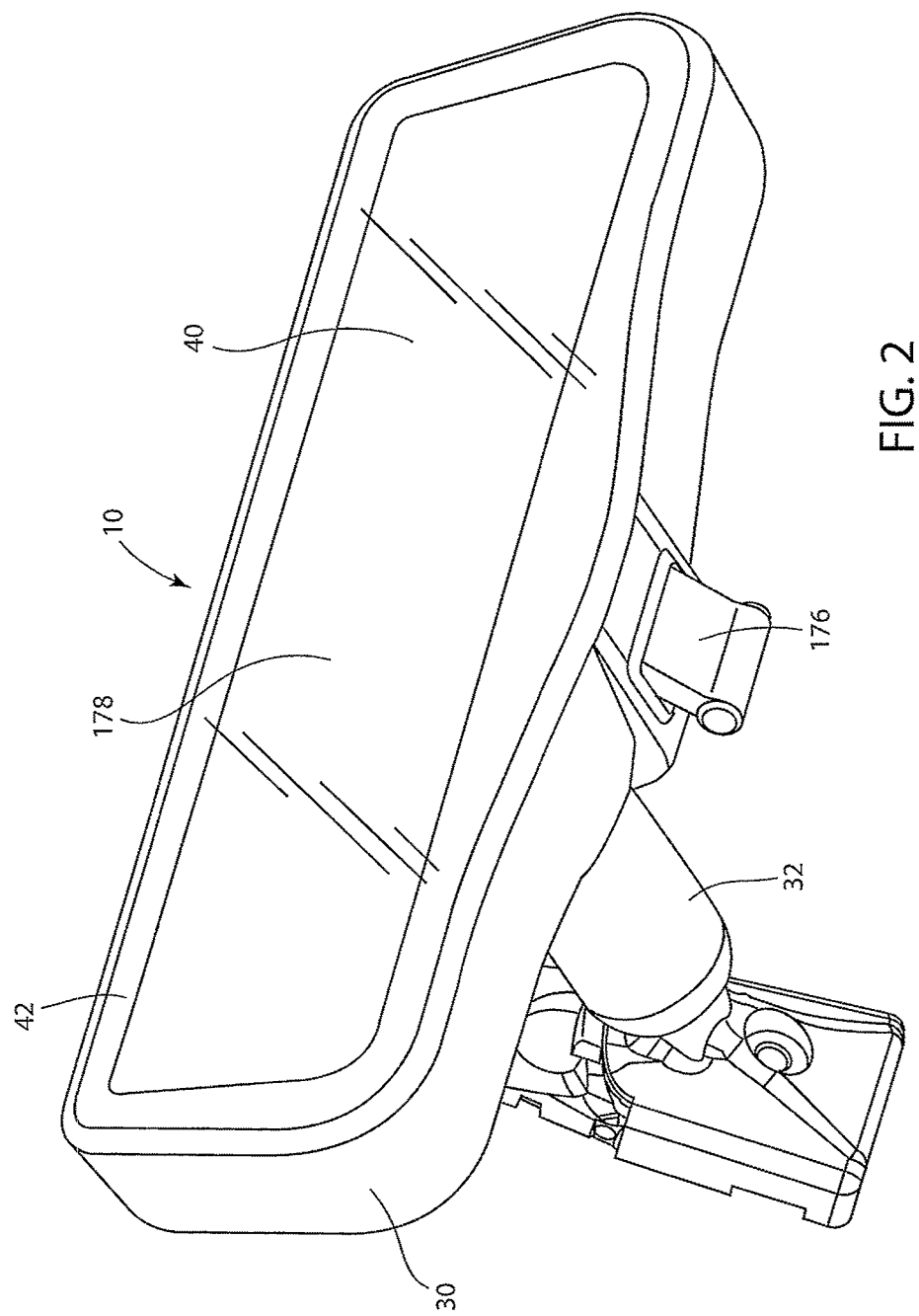
FIG. 2 is a bottom front perspective view of the display mirror assembly of FIG. 1.
Figure 3:
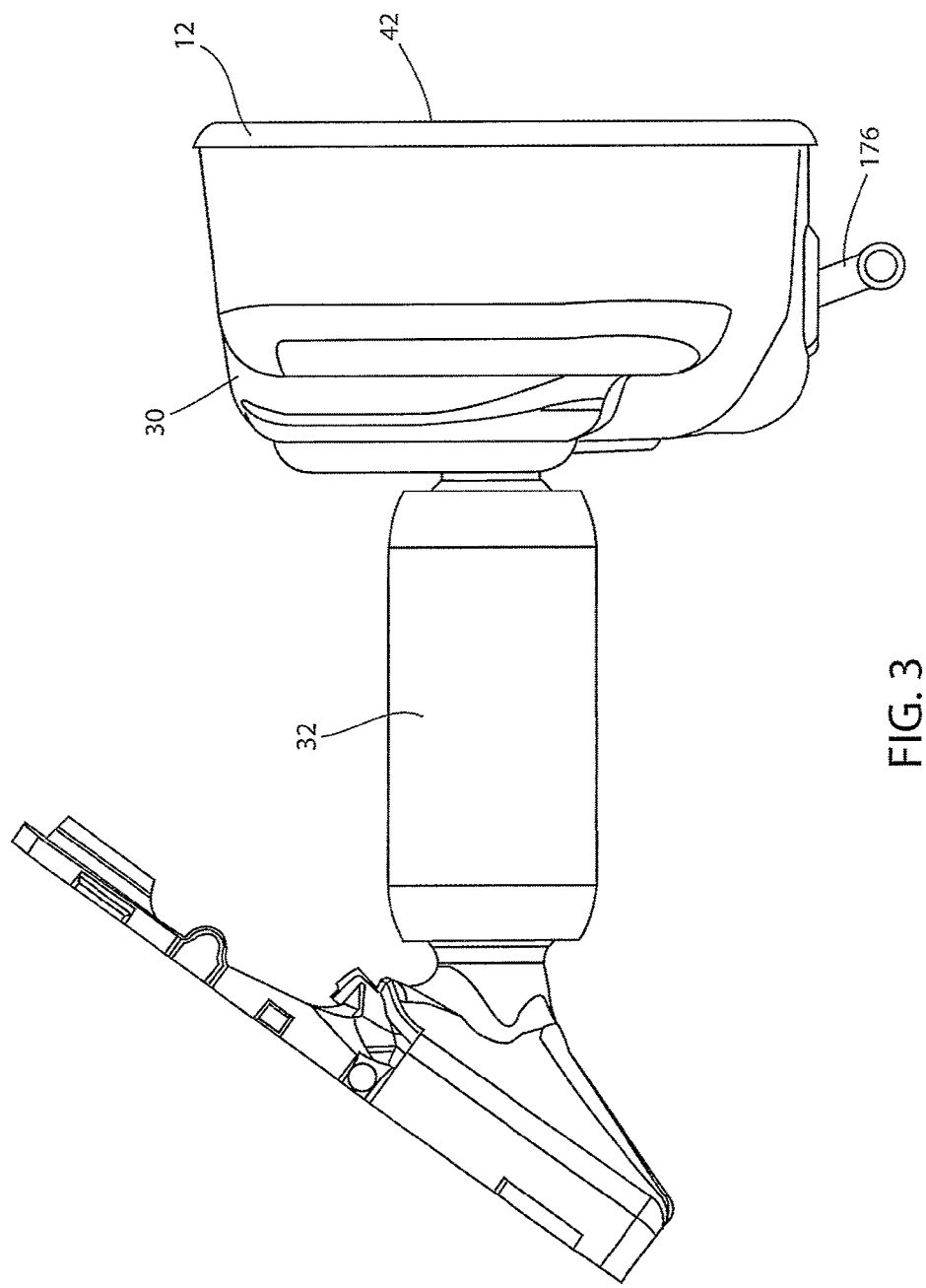
FIG. 3 is a side elevation view of the display mirror assembly of FIG. 1.
Figure 4:
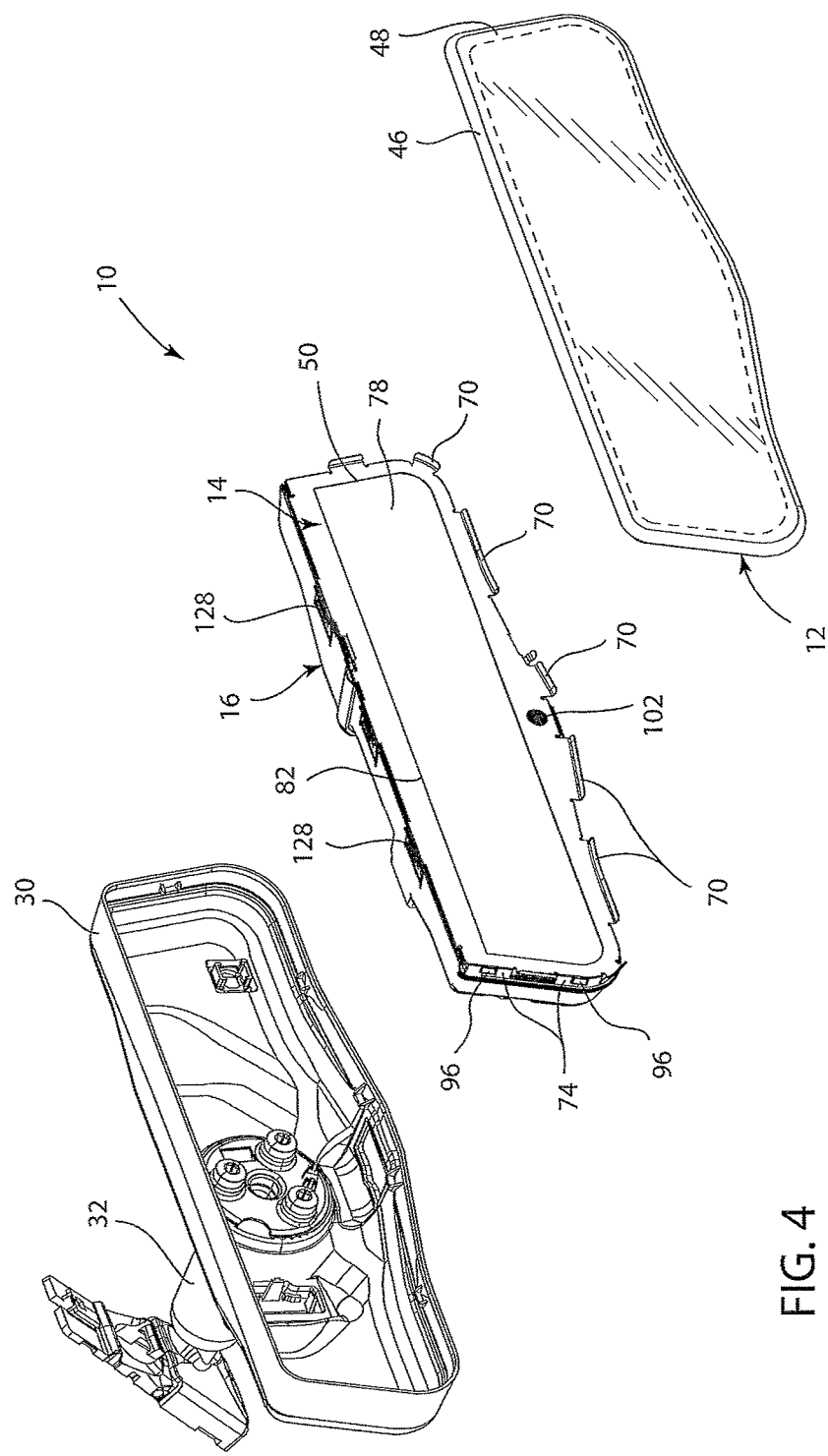
FIG. 4 is a partially exploded top perspective view of the display mirror assembly of FIG. 1.
Figure 5:
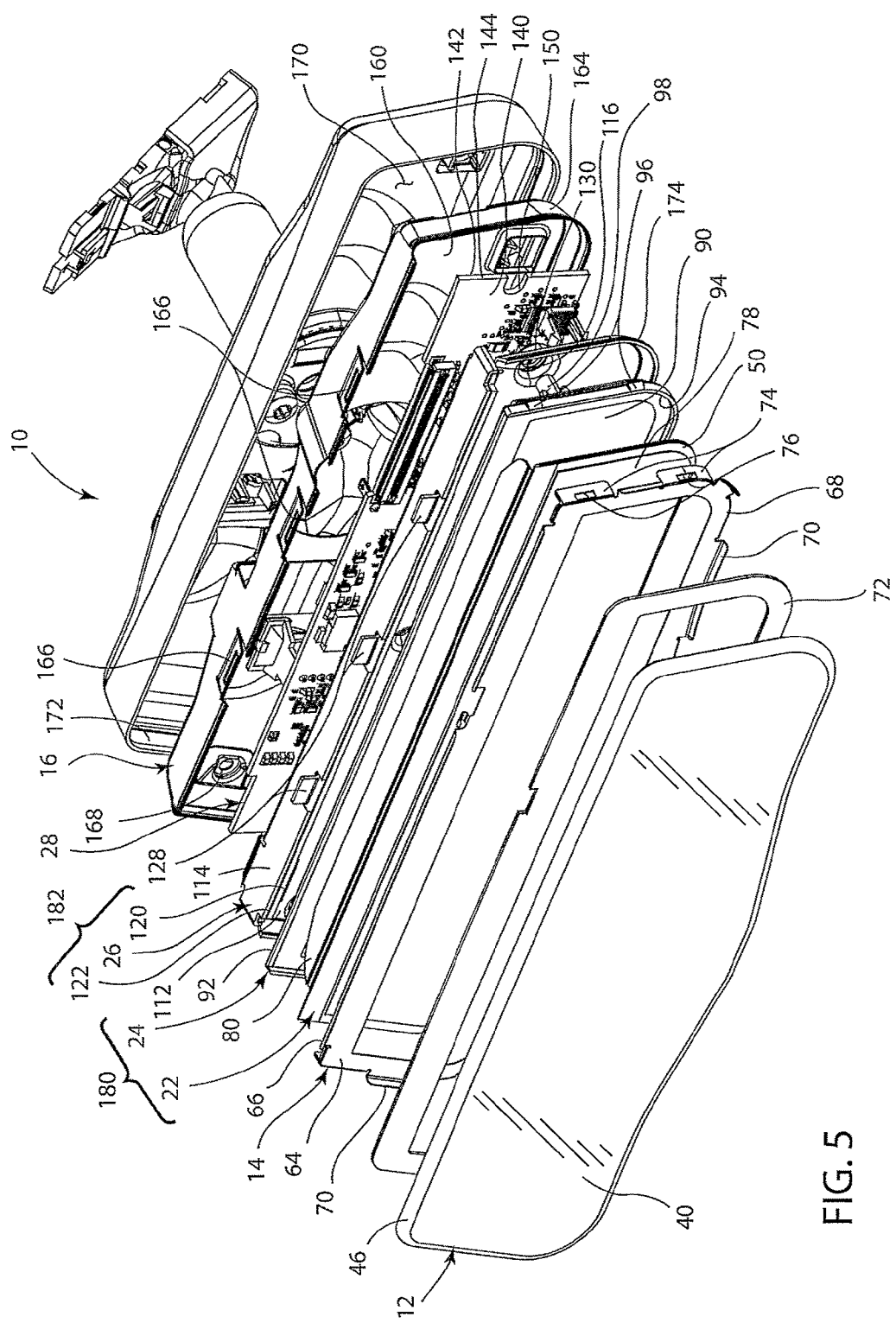
FIG. 5 is a partially exploded top perspective view of the display mirror assembly of FIG. 1.
Figure 6:
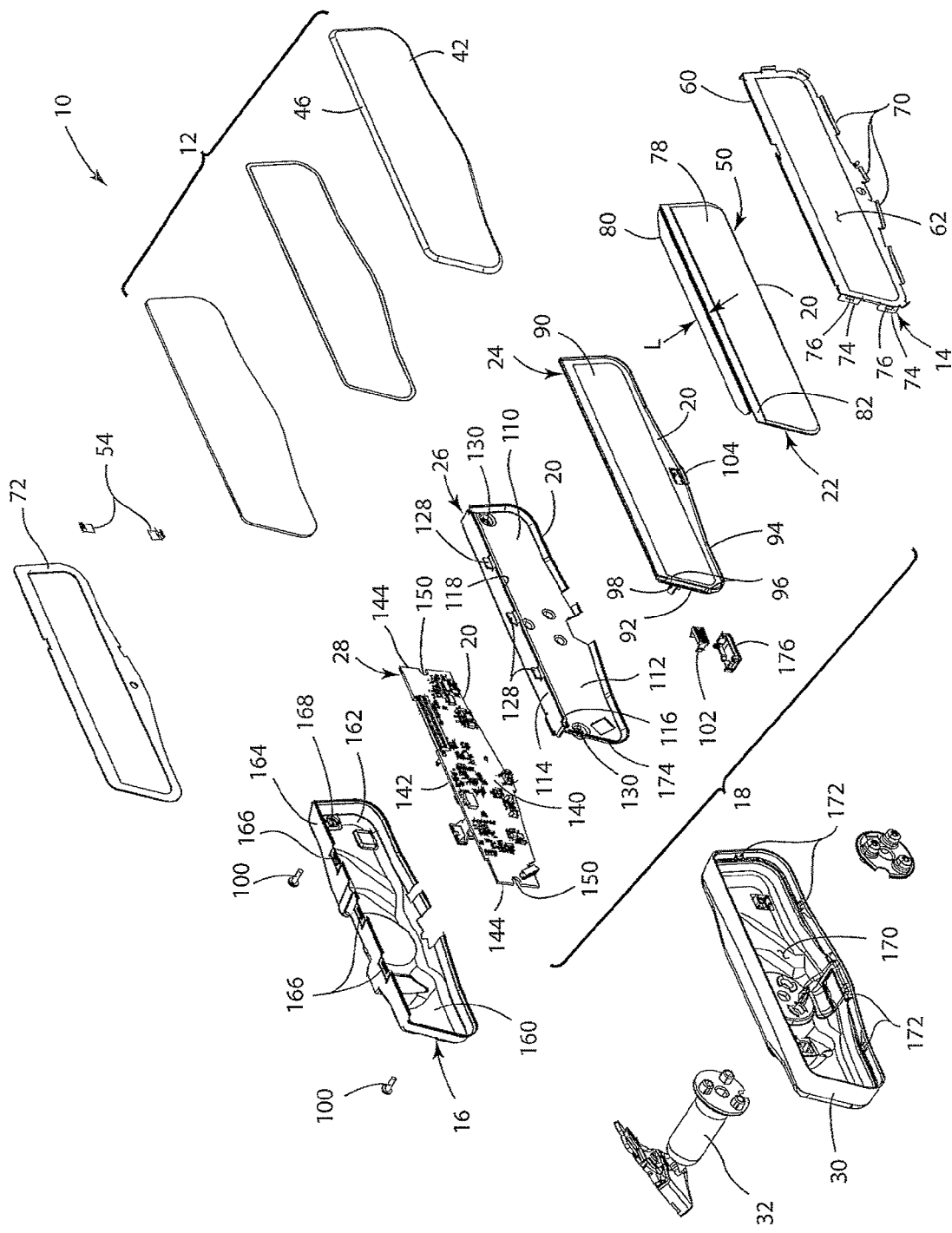
FIG. 6 is an exploded top perspective view of the display mirror assembly of FIG. 1.

Referring now to FIGS. 1-3, reference numeral 10 generally designates a display mirror assembly for a vehicle. The display mirror assembly 10 includes a partially reflective, partially transmissive element 12 (also referred to as a "glass element" herein) and a display module 18 (FIG. 6) that is viewed through the partially reflective, partially transmissive element 12. As shown in FIG. 4, the display mirror assembly 10 further includes a front shield 14 and a rear shield 16 which shield and support the partially reflective, partially transmissive element 12 and the display module 18 (FIG. 6). As shown in FIGS. 5-6, the display module 18 generally includes several components 20, including a display 22, an optic block 24, a heat sink 26, and a primary PCB 28. A housing 30 at least partially receives the front shield 14, the display module 18, and the rear shield 16, and includes a mounting member 32 extending rearwardly therefrom. The mounting member 32 is adapted for mounting on a windshield of a vehicle.

Referring generally to FIGS. 1-3, the display mirror assembly 10 has a viewing area 40, which includes a front surface 42 of the glass element 12. The viewing area 40 may be a rectangular shape, a trapezoidal shape, or any custom contoured shape desired for aesthetic reasons.

Referring to FIG. 4, the display mirror assembly 10 for a vehicle is shown, with the components partially exploded. The display mirror assembly 10 may include the glass element 12, the front shield 14 and the rear shield 16 encapsulating the display module 18, the rear housing 30, and the mounting member 32. As shown in FIGS. 4-6, the front shield 14, the rear shield 16, and components of the display module 18 include various retaining features to operably connect the several components of the display module 18 with the front shield 14, the rear shield 16 and each other, and to provide support to the display module 18. Specifically, the front shield 14 includes retaining features to operably connect the front shield 14 to the display module 18, and the rear shield 16 has retaining features to operably connect the rear shield 16 to the display module 18. Retaining features may include snap fit connections, tab and slot connections, screw connections, and other known retaining features. Some or all of the retaining features may also be strengthened by the addition of adhesive compounds. Certain non-limiting illustrative examples of retaining features are described in detail herein.

An exemplary embodiment of the display mirror assembly 10 will hereafter be described in greater detail, beginning with the elements closest to the intended viewer, and extending rearwardly away from the viewer. As shown in FIG. 4, the glass element 12 is generally planar, with an outer perimeter 46 and a border 48 around the outer perimeter 46. The border 48 may incorporate a chrome ring or other similar finish to conceal the front shield 14 and other elements located behind the glass element 12 in the display mirror assembly 10, including without limitation a seal on an electrochromic unit, an applique, foam adhesive, or pad printing. The border 48 may extend from the outer perimeter 46 of the glass element 12 to an outer edge 50 of the display 22. Alternatively, the border 48 may be narrower and not reach from the outer perimeter 46 to the outer edge 50 of the display 22 along at least some portions of the border 48. The perimeter of the glass element 12 may also have a ground edge, a bezeled edge, or be frameless.

The glass element 12 may be an electro-optic element or an element such as a prism. One non-limiting example of an electro-optic element is an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "Electrochromic Layer And Devices Comprising Same," U.S. Pat. No. 5,998,617 entitled "Electrochromic Compounds," U.S. Pat. No. 6,020, 987 entitled "Electrochromic Medium Capable Of Producing A Pre-selected Color," U.S. Pat. No. 6,037,471 entitled "Electrochromic Compounds," U.S. Pat. No. 6,141,137 entitled "Electrochromic Media For Producing A Pre-selected Color," U.S. Pat. No. 6,241,916 entitled "Electrochromic System," U.S. Pat. No. 6,193,912 entitled "Near Infrared-Absorbing Electrochromic Compounds And Devices Comprising Same," U.S. Pat. No. 6,249,369 entitled "Coupled Electrochromic Compounds With Photostable Dication Oxidation States," and U.S. Pat. No. 6,137,620 entitled "Electrochromic Media With Concentration Enhanced Stability, Process For The Preparation Thereof and Use In Electrochromic Devices"; U.S. Pat. No. 6,519, 072, entitled "Electrochromic Device"; and International Patent Application Publication Nos. WO 98/42796 entitled "Electrochromic Polymeric Solid Films, Manufacturing Electrochromic Devices Using Such Solid Films, And Processes For Making Such Solid Films And Devices," and WO 99/02621 entitled "Electrochromic Polymer System," which are herein incorporated by reference in their entirety. The glass element 12 may also be any other element having partially reflective, partially transmissive properties. To provide electric current to the glass element 12, electrical elements are provided on opposing sides of the element, to generate an electrical potential therebetween. A J-clip 54 is electrically engaged with each electrical element, and element wires extend from the J-clips 54 to the primary PCB 28.

Now referring to FIGS. 5-6, the front shield 14 functions to shield the display module 18 from radio frequency (RF) electromagnetic radiation and to provide support for the glass element 12 and the display module 18. The front shield 14 is formed from one or more materials which are suitable to block RF radiation, including without limitation steel. As a non-limiting example, the front shield 14 can be formed from a stamped steel material which is about 0.2 mm thick.

Also as shown in FIGS. 5-6, the front shield 14 is generally shaped in the form of a ring 60 having an opening 62 therethrough. The front shield 14 has a front side 64, rear side 66, and an outer surface 68 which is generally coextensive with the outer perimeter 46 of the glass element 12. The front shield 14 includes retaining features 70 extending forwardly therefrom, to mechanically engage the glass element 12. An adhesive, such as a foam adhesive 72, may also be used to secure the glass element 12 to the front shield 14. The front shield 14 further includes rearwardly directed tabs 74 to operably engage the rear shield 16 (or a component of the display module 18). The rearwardly directed tabs 74 further include holes 76 therethrough, to operably engage at least one component of the display module 18, such as the optic block 24.

As best shown in FIG. 6, the display module 18 is disposed behind the front shield 14, with the display 22 viewable through the opening 62 in the front shield 14. The components of the display module 18 are ordered, from the front shield 14 toward the rear shield 16, the display 22, the optic block 24, the heat sink 26, and the primary PCB 28.

The display 22 is generally planar, with the outer edge 50 defining a front surface 78. The front surface 78 of the display 22 can be shaped to correspond to and fit within the shape of the viewing area 40 of the display mirror assembly 10. Alternatively, the display 22 may have a front surface 78 which fits within, but is not complementary to the viewing area 40, for example, where the front surface 78 of the display 22 is generally rectangular and the front surface 42 of the glass element 12 has a contoured outer perimeter 46. The distance between the outer edge 50 of the display 22 and the outer perimeter 46 of the glass element 12 is about 9 mm or less along at least a portion of the outer edge 50. In one embodiment, the display 22 has a viewable front surface 78 area which is about 56% to about 70% of the viewing area 40 of the glass element 12.

The display 22 may be LCD, LED, OLED, plasma, DLP or other display technology. The display 22 further includes a flexible electrical connector 80 which is operably mechanically and electrically connected with the primary PCB 28. The flexible electrical connector 80 has a length L which is sufficient to wrap around the display module 18 components between the display 22 and the primary PCB 28, and has a width which extends substantially along a top edge 82 of the display 22. The flexible electrical connector 80, when operatively connected to the primary PCB 28, aids in securing the components along a top edge of the display module 18.

As shown in FIGS. 5-6, the optic block 24 includes a front side 90 which is facing the display 22, a rear side 92 which is facing the heat sink 26, and an outer perimeter 94. The optic block 24 further includes tabs 96 extending generally outwardly therefrom around at least a portion of the outer perimeter 94. The tabs 96 are received through the holes 76 in the rearwardly directed tabs 74 of the front shield 14, to operably mechanically engage the optic block 24 with the front shield 14. The optic block 24 further includes at least one screw-receiving element 98 on the rear side 92 thereof. The screw-receiving element 98 is adapted to engage a screw 100 threaded through the rear shield 16 and the display module 18 components between the optic block 24 and the rear shield 16. In alternate embodiments, the tabs 96 for engaging the front shield 14, the screw-receiving elements 98, or both, may be provided on different components of the display module 18.

As shown in FIGS. 4 and 6, a glare sensor 102 is provided on the front side 90 of the optic block 24, in a location which receives light through the glass element 12, and which is not behind the display 22. The glare sensor 102 is snap-fit into a receiving aperture 104 in the optic block 24. The glare sensor 102 receives light from headlamps of a trailing vehicle, and measures information regarding the likely glare visible on the glass element 12 and communicates this information to the display mirror assembly 10 so that the display mirror assembly 10 can be optimized to allow viewing of the display 22 through the glass element 12. The glare sensor's 102 optical vertical/horizontal pattern is symmetrical, so that orientation of the glare sensor 102 is not significant. The glare sensor 102 could also be packaged at least partially within the housing 30 of the display mirror assembly 10 and have a light guide which is configured to propagate light to the glare sensor 102. The glare sensor 102 could also be an imager on a rear portion of the vehicle, wherein a signal representative of the received light is communicated from the glare sensor 102 to the display mirror assembly 10.

As shown in FIGS. 5-6, the heat sink 26 is disposed rearwardly from the optic block 24, and dissipates heat generated by the primary PCB 28 and other components of the display module 18. The heat sink 26 has a generally planar body 110 with a front side 112 and a top edge 114. A channel 116 extends along the top edge 114 of the heat sink 26, and defines a forward-facing opening 118. An edge lit PCB 120 and a gap filler 122 are disposed partially within the channel 116, with the edge lit PCB 120 extending generally perpendicularly from the heat sink 26 in a forward direction, and having an operable side which is facing downward, away from the top edge 114. The edge lit PCB 120 includes a wiring adapted for electrical connection with the primary PCB 28, to permit electrical power and signals to be supplied to the edge lit PCB 120. A plurality of tabs 128 extend upwardly from the top edge 114 of the heat sink 26, for mechanical engagement with the rear shield 16.

The heat sink 26 may include at least one hole 130 therethrough to receive a screw 100 threaded from the rear shield 16 to the optic block 24. The screw-receiving element 98 of the optic block 24 is optionally raised, to extend through the hole 130 in the heat sink 26 and receive the screw 100. The screw-receiving element 98 of the optic block 24 may also aid in alignment of display module 18 components during manufacturing and will provide additional reinforcement to the display module 18 in the interaction between components if it is raised.

The primary PCB 28 operates to provide electrical power and control for the components of the display module 18 and for the glass element 12. As shown in FIGS. 5-6, the primary PCB 28 is generally planar, with a front side 140, a rear side 142, and side edges 144. The front side 140 is facing the heat sink 26 and the rear side 142 is facing the rear shield 16. Electrical components are generally oriented on the rear side 142 of the primary PCB 28. The primary PCB 28 includes an electrical connector for operable electrical engagement with the electrical element wires of the glass element 12, an electrical connector for operable electrical engagement with the flexible electrical connector 80, and an electrical connector for operable electrical engagement with the wiring harness. Additional functional elements that may be provided on the display mirror assembly 10 may also be electrically connected to the primary PCB 28, such as the glare sensor 102 and any other functional buttons or features of the display mirror assembly 10. The primary PCB 28 further includes side cutouts 150 along the side edges 144, to permit passage of the screws 100 used to secure the rear shield 16 to the components of the display module 18.

The rear shield 16 functions to shield the display module 18 from RF radiation. As best shown in FIGS. 4-5, the rear shield 16 also serves to encapsulate the display module 18, and further interlock the components of the display mirror assembly 10. The rear shield 16 is formed from a material which is suitable to block such radiation and provide the desired support for the display mirror assembly 10, such as steel. As a non-limiting example, the rear shield 16 can be formed from stamped steel with a thickness of about 0.381 mm.

As shown in FIG. 6, the rear shield 16 includes a rear wall 160 having an outer perimeter 162, and a peripheral wall 164 extending forwardly from the rear wall 160 about at least a portion of the outer perimeter 162. The peripheral wall 164 has slots 166 therein, which correspond to the upstanding tabs 128 along the top edge 114 of the heat sink 26 and are operably mechanically engageable therewith. The rear shield 16 further includes at least one hole 168 therethrough to accommodate the screw 100, where the screw 100 extends through the rear shield 16 and into the components of the display module 18 to secure the rear shield 16 to the display module 18. The screw 100 extends through the rear wall 160 of the rear shield 16, through the side cutouts 150 of the primary PCB 28, through the heat sink 26, and is secured to the screw-receiving element 98 on the rear side 92 of the optic block 24.

The rear housing 30 includes a forwardly directed cavity 170, into which all or a portion of the front shield 14, rear shield 16, and the display module 18 supported therebetween are inserted. The rear housing 30 includes mechanically engaging features 172 which snap fit with corresponding engagement features 174 located on the peripheral wall 164 of the rear housing 30 or on a display module 18 component such as the heat sink 26. The mounting member 32 is operably engaged with the rear housing 30 in any known manner.

Figure 7:
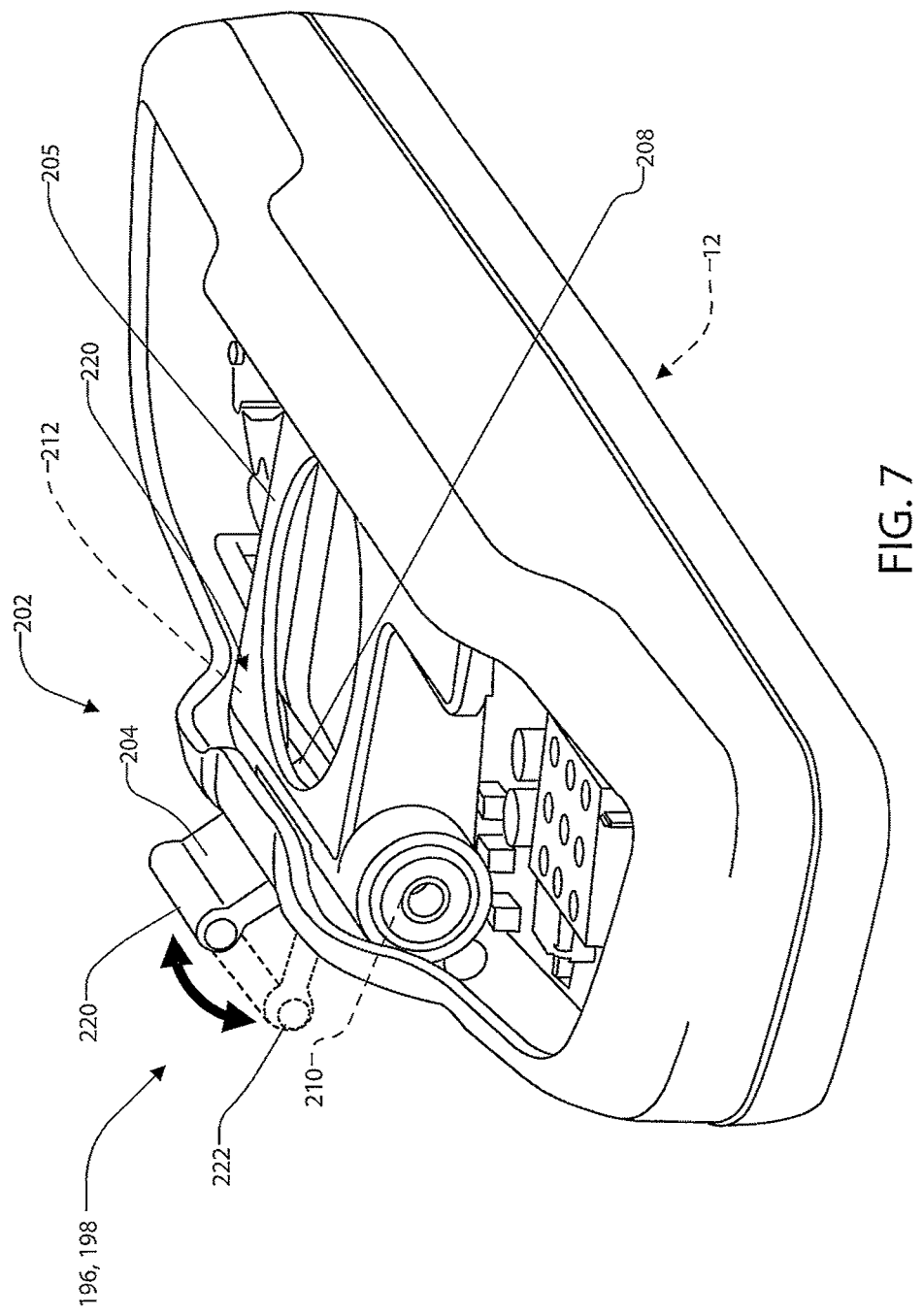
FIG. 7 is a perspective view of an adjusting assembly that may be incorporated with the display mirror.

With respect to the following description, the display mirror assembly 10 is considered "on axis" when a line perpendicular to the plane of the glass element 12 extends toward the eyes of a viewer. Due to the display 22 being viewed through the glass element 12, any glare on the glass element 12 may interfere with the visibility of the display 22. When the display mirror assembly 10 is on axis and is being used during night time driving conditions, headlights from a trailing vehicle (i.e., a vehicle driving behind the vehicle with the display mirror assembly 10) can cause a glare which is visible to the driver. According to one embodiment of the present invention, an actuator device 176, as shown in FIGS. 2, 3 and 7, is operably coupled to the display mirror assembly 10. When actuated, the actuator device 176 moves at least the glass element 12 off axis (i.e., away from a direct line toward the driver's eyes). Typically, actuation of the actuator device 176 tilts the glass element 12 upwards, to move the mirror to an off-axis position. However, it should be appreciated that the actuator device 176 can be configured to move the mirror in any direction with respect to the axis. The actuator device 176 can also be configured to move the display 22 upon activation. The actuator device 176 can also be configured to turn the display 22 on or off. Thus, when the actuator device 176 is actuated to move the mirror off axis, the display 22 can be turned off.

Referring now to FIG. 7, an exemplary embodiment of the actuator device 176 is shown as the actuator device 196. As illustrated, the actuator device 196 may be configured to form a smooth adjusting assembly by incorporating a soft adjust mechanism 198. In an exemplary implementation, the smooth adjusting assembly may be implemented as a toggle mechanism 202. The toggle mechanism 202 may be utilized in the assembly 10 to perform similar functions to the actuator device as discussed herein, and as such, like reference numerals are utilized to discuss similar components for clarity. The soft adjust mechanism 198 may be configured to prevent a jarring or snapping motion that may be attributed to adjusting some actuator devices from a first position to a second position to selectively activate a display 22 and/or adjust an axial position of a glass element 12 as discussed herein.

The toggle mechanism 202 may be configured to move or adjust the angular position of the glass element 12. The toggle mechanism 202 may comprise a lever 204 configured to pivotally engage a housing 205 of an actuator assembly 206 or positioning assembly via an axial engagement portion 208. As discussed herein, the toggle mechanism 202 may form a portion of the actuator assembly 206, which may be configured to adjust an angular position of the glass element 12. Further, the actuator assembly 206 may correspond to the soft adjust mechanism 198. The axial engagement portion 208 may comprise a first engagement end portion 210 and a second engagement end portion 212. In this configuration, the toggle mechanism 202 may be manually actuated by a passenger or operator of a vehicle to move the mirror assembly 10 to an on-axis or off-axis position relative to a reflected line of sight directed toward the eyes of the operator.

Referring now to FIGS. 7, 8A, and 8B, the actuator assembly 206 may comprise a positioning housing 205 forming a first engaging aperture 214 and a second engaging aperture 216 configured to receive the first engagement end portion 210 and the second engagement end portion 212, respectively. The toggle mechanism 202 may be rotated about a first pivotal axis 218 from a first position 220 to a second position 222 as demonstrated by the arrow in FIG. 7. The first position 220 may correspond to an off-axis position wherein the glass element 12 is off axis from the reflected line of sight. Additionally, in the first position 220, the actuator assembly 206 may further be configured to activate the display 22 in an on-state.

The second position 222 may be configured to orient the toggle mechanism 202 in the on-axis position. As discussed herein, changing from the second position 222 to the first position 220 may be manually actuated by a passenger of the vehicle to simultaneously adjust the glass element 12 to an on-axis position and deactivate the display 22 to an off-state. This novel functionality may provide for simple and accurate operation of the actuator assembly 206. In this configuration, the display 22 may be deactivated such that light emitted therefrom does not interfere with the light reflected from the glass element 14 corresponding to a rearward directed field of view from the vehicle.

Changing from the first position 220 to the second position 222 may be manually actuated to simultaneously adjust the glass element 12 to an off-axis position and activate the display 22. In this configuration, the reflected field of view from the glass element 12 is directed toward a headliner of the vehicle and away from the eyes of the operator. Additionally, in the first position, the display 22 may be activated via the primary PCB 28 such that image data corresponding to a rearward-directed field of view is displayed on the display, which may be viewed by the operator of the vehicle. In this way, the image data on the display 22 may be visible to an operator without viewing light reflected from the glass element 12. As further discussed in reference to FIGS. 8A and 8B, the actuator assembly 206 may comprise a damper 224 configured to control the rotational movement about the first pivotal axis 218 of the axial engagement portion 208 of the toggle mechanism 202 from a first position 220 to a second position 222 and vice versa.

Referring now to FIGS. 8A and 8B, the actuator assembly 206 and toggle mechanism 202 are shown, respectively. The actuator assembly 206 may form an intermediate connection between the mounting member 32 and the rear housing 30 of the mirror assembly 10. For example, the mounting member 32 may be configured to connect to a receiving member 230 of the actuator assembly 206. Additionally, the housing 205 may be in pivotal connection with the receiving member 230 via a second pivotal axis 232. The second pivotal axis 232 may be formed by a second pivoting assembly 234 formed by a fulcrum pin 236 of the receiving member 230 and a plurality of rotational brackets 238 of the housing 205. In this configuration, the housing 205 may rotate about the fulcrum pin 236 in response to the toggle mechanism 202 being adjusted from the first position 220 to the second position 222.

As previously discussed, the toggle mechanism 202 may be configured to pivotally engage the housing 205 via the first engagement end portion 210 and the second engagement end portion 212. The first engagement end portion 210 and the second engagement end portion 212 may be configured to connect with the first engaging aperture 214 and the second engaging aperture 216 to define the first pivotal axis 218. The toggle mechanism 202 may further form a lateral displacement arm 240 configured to engage a lever aperture 242 formed in a distal end portion 244 of the receiving member 230. In this way, the housing 205 may be moved relative the mounting member 32.

The housing 205 may further be connected to the rear housing 30 via a plurality of fastener apertures 239. A plurality of fasteners may interconnect fastening tabs of the housing 205 forming the fastener apertures 239 to the rear housing of the mirror assembly 10. In this configuration, the receiving member 230 forms a lever configured to adjust the angular orientation of the rear housing 30 and the mirror assembly 10. In this way the glass element 12 may be shifted from the on-axis position to the off-axis position as discussed herein.

In operation, the lever 204 of the toggle mechanism 202 may be rotated about the first pivotal axis 218 to adjust the position of the lateral displacement arm 240. The motion of the lateral displacement arm 240 may cause the distal end portion 244 of the receiving member 230 to similarly move due to the engagement of the lateral displacement arm 240 and the lever aperture 242. The motion of the receiving member 230 may further result in a change in an angle of the receiving member 230 relative to the housing 205. The change in the angle between the receiving member 230 and the housing 205 may result in the rear housing 30 and consequently, the mirror assembly 10 being adjusted from the first position 220 to the second position 222.

The movement from the first position 220 to the second position 222 is controlled by the damper 224. The damper 224 may correspond to a rotational damper comprising a rotating portion 250 in connection with the first engagement end portion 210 and a fixed portion 252. The fixed portion 252 may be in connection with the housing 205 via an engaging sleeve 254 formed by or in connection with the housing 205. The rotational movement of the rotating portion 250 relative the fixed portion 252 is controlled or dampened such that the lever 204 of the toggle mechanism 202 moves smoothly from the first position 220 to the second position 222.

The damper 224 may correspond to various forms of rotational dampers. For example, the damper 224 may correspond to a viscous damper having rigid plastic structure. In some embodiments, the damper 224 may correspond to a rotary or rotational damper configured to limit a rate of change of rotational motion of the toggle mechanism 202 about the first pivotal axis 218. In some embodiments, the damper 224 may similarly be implemented as a lateral damping mechanism configured to limit the lateral movement of the lateral displacement arm 240, which may be anchored to the housing 205. As discussed herein, the damper 220 may provide for controlled movement of the actuator assembly 206 relative the receiving member 230 to control the movement of the mirror assembly 10.

Though discussed in detail in reference to the mirror assembly 10, the actuator assembly 206 incorporating the damper 224 may be utilized in a variety of display mirrors and/or prism mirrors. For example, the mirror assembly may be utilized in a conventional prism mirror of a vehicle comprising a actuator assembly configured to adjust an angular orientation of a glass element or mirror assembly. Such a mirror may correspond to a two-position prism mirror such as that discussed in U.S. Pat. No. 3,740,122 A, which is incorporated herein by reference in its entirety.

Referring now to FIGS. 9A, 9B, 9C, 10A, and 10B; an exemplary embodiment of an actuator assembly 300 configured to adjust a rotational orientation of the glass element 12 is shown. For example, the actuator assembly 300 may be configured to adjust the glass element 12 from the off-axis position to an on-axis position as discussed in reference to FIG. 7. The actuator assembly 300 may be implemented similar to the actuator device 176 and may be configured to move the glass element 12 upon activation of the display 22. The actuator assembly 300 may be configured to turn the display 22 on or off via a switch device 302. The switch device 302 may be configured to identify when the actuator assembly 300 and the glass element 12 are arranged in the off-axis position or the on-axis position.

The actuator assembly 300 may comprise a toggle switch 304 configured to adjust an orientation of the glass element 12. The toggle switch 304 may engage a support bracket 306 and a rotational damper 308 or barrel damper along a first pivotal axis 310. An engaging portion 312 of the toggle switch 304 and an engaging surface 314 of the rotational damper 308 may form a pivotal interface 316 configured to engage a first channel 318 or trough formed by the support bracket 306. In this configuration, the toggle switch 304 is rotationally coupled to the support bracket 306 along the first pivotal axis 310. The pivotal interface 316 may be substantially cylindrical in shape and may form a camshaft configured to engage a corresponding interior surface of the first channel 318.

The engaging surface 314 of the rotational damper 308 may comprise a locating feature 320 configured to engage a complementary receiving aperture (not shown) formed in the first channel 318. Additionally, the engaging portion 312 of the toggle switch 304 may engage the rotational damper 308 such that the toggle switch 304 and a damped cylinder 322 within of the rotational damper 308 rotate together about the first pivotal axis 310. In this configuration, a rotation of the toggle switch 304 and the damped cylinder 322 may be locked such that the rotation of the toggle switch 304 is damped about the first pivotal axis 310 by the rotational damper 308 relative to the support bracket 306.

As discussed herein, the pivotal interface 316 of the actuator assembly 300 may be configured to form a smooth adjusting assembly. The rotational damper 308 may be configured to engage the support bracket 306, which may further be in connection with the primary PCB 28. As such, the support bracket 306 and the actuator assembly 300 may correspond to an example of a positioning assembly 324 that may be configured to engage a mounting member. The mounting member may be similar to the mirror mount 32 and have a socket configured to engage a ball adaptor 326. In this configuration, the mounting member may be adapted for mounting on a windshield of a vehicle to secure a mirror assembly (e.g. the mirror assembly 10).

The toggle switch 304 may form a second channel 328 or trough configured to receive an engaging member 330 of a slider component 332 proximate a first end portion 334 of the slider component 332. The slider component 332 may form a plurality of spring guide slots 336 and corresponding pivot plate slots 338. Each of the pivot plate slots 338 may be configured to receive an engaging portion 340 of a pivot plate 342 proximate a second end portion 344 of the slider component 332. A slider spring 346 may be disposed in each of the spring guide slots 336 and may also engage a receiving pocket 348 formed by the pivot plate 342. In this configuration, a rotation of the toggle switch 304 may cause the engaging member 330 to translate in response to the movement of the second channel 328.

The movement of the engaging member 330 may result in a translation of the slider component 332 or the pivot plate 342 about the first pivotal axis 310. The translation of the pivot plate 342 may follow a concentric or offset path about the first pivotal axis in a cam-follower configuration. In operation, the translation of the pivot plate 342 may cause a compression or expansion of the slider springs 346. Accordingly, a spring loaded configuration of the slider component 332 of the pivot plate 342 may restrict and control the motion of the toggle switch 304.

The pivot plate 342 may form at least one pivoting member 350 configured to engage at least a third channel 352 or trough formed by the support bracket 306. Additionally, the pivot plate may form an arm 354 configured to support the ball adaptor 326 proximate a distal end portion 356. In this configuration, the pivot plate 342 may rotate about the at least one pivoting member 350, which may be aligned along a second pivotal axis 358. In this configuration, a rotational movement of the toggle switch 304 about the first pivotal axis 310 may induce the translation of the slider component 332. The rotational movement of the toggle switch 304 may further result in a rotation of the pivot plate 342 about the second pivotal axis 358.

The rotation of the pivot plate 342 may result in the adjustment of the angular position of the glass element 12 from a first position 360 to a second position 362 and vice versa. The first position 360 is demonstrated in FIG. 9B, and the second position 362 is demonstrated in FIG. 9C. In the first position 360, the orientation of the pivot plate 342 may correspond to an off-axis orientation. In the second position 362, the orientation of the pivot plate 342 may correspond to an on-axis orientation. Accordingly, the first position 360 may correspond to the off-axis orientation in which the line of sight from the glass element 12 is directed away from the eyes of an operator. The second position 362 may correspond to the on-axis orientation in which the line of sight from the glass element 12 is directed toward the eyes of an operator.

Figure 9A:
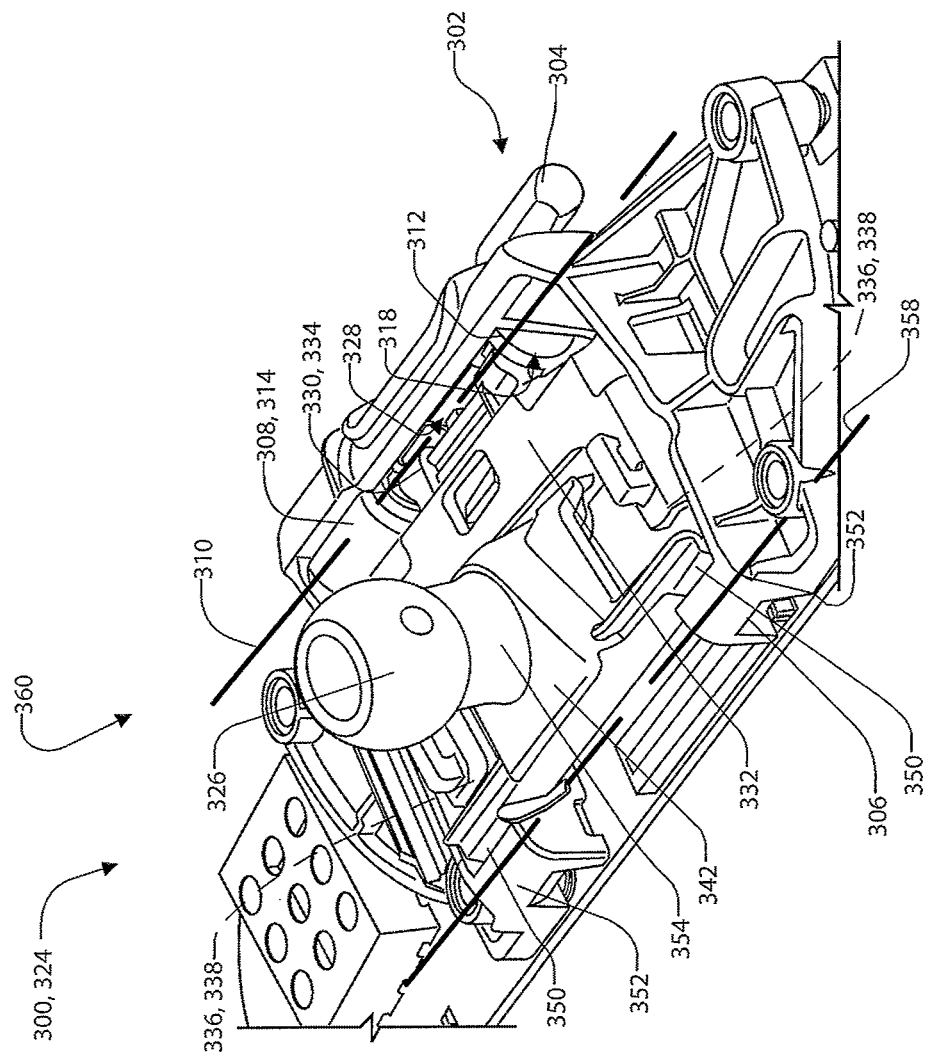
FIG. 9A is a projected view of a partial assembly of an actuator assembly comprising a sensor configured to detect a position of a glass element.

An arrow 363 demonstrated in FIG. 9C may provide an exemplary direction extending from the slider component 332 and a blade 364 or protrusion in the second position 362. In the second position, the slider component 332 and the blade 364 are positioned such that the blade engages a sensor 366. The first position 360 of the toggle switch 304 is generally demonstrated in FIGS. 9A, 9B, and 10B. The second position 362 is generally demonstrated in in FIGS. 9C and 10A.

The slider component 332 may comprise the blade 364 or protrusion extending from the slider component 332 toward the primary PCB 28. The sensor 366 may be disposed on the primary PCB 28 on a rear side directed toward the slider component 332. In this configuration, the blade 364 of the slider component 332 may translate into and out of a valley 368 or channel formed by the sensor 366 in response to the toggle switch 304 being arranged in the second position 362 or the first position 360, respectively. The translation of the blade 364 may correspond to the translation of the pivot plate 342 about the first pivotal axis 310. In response to the presence of the blade 364 being located in the valley 368, the sensor 366 may identify that the toggle switch 304 is positioned in a corresponding position, for example that the toggle switch is located in the second position 362.

The sensor 366 may correspond to various forms of sensors and/or sensory devices that may be operable to detect the presence of an object in proximity thereto. For example, the sensor 366 may correspond to a capacitive sensor, an inductive sensor, a magnetic sensor, an optical sensor, etc. In an exemplary embodiment, the sensor 366 may correspond to an optical sensor comprising an emitter and a receiver. The emitter and the receiver may be configured to generate and detect an emission from a first protruding member 370 to a second protruding member 372. The first protruding member 370 and the second protruding member 372 may form the valley 368 aligned with and configured to receive the blade 364. In this configuration, the sensor 366 may detect the toggle switch 304 in the first position 360 and the second position 362.

For example, in response to positioning of the toggle switch 304 in the second position 362, the pivot plate 342 and the slider component 332 may rotate toward the primary PCB 28. The rotation of the slider component 332 toward the primary PCB 28 may cause the blade 364 or protrusion to pass into the valley 368 formed by the sensor 366. In an exemplary embodiment wherein the sensor 366 corresponds to an optical sensor, the emission passing from the emitter to the receiver may be blocked by the blade 364. The blockage of the emission may be detected by a controller in communication with the sensor 366. In response to the detection of the blockage, the controller may control the display 22 to an 'OFF' condition.

In response to positioning of the toggle switch 304 in the first position 360, the pivot plate 342 and the slider component 332 may rotate away from the primary PCB 28. The rotation of the slider component 332 away from the primary PCB 28 may cause the blade 364 or protrusion to move out of the valley 368 formed by the sensor 366. In an exemplary embodiment wherein the sensor 366 corresponds to an optical sensor, the emission passing from the emitter to the receiver may be received by the receiver. The receipt of the emission may be detected by a controller in communication with the sensor 366. In response to the detection, the controller may control the display 22 to an 'ON' condition.

Referring now to FIGS. 11A, 11B, 12A, and 12B; assembly views of the actuator assembly 300 are shown. The assemblies shown in FIGS. 11A and 12A may correspond to a front view and rear view of the support bracket 306 or carrier plate of the actuator assembly 300. Accordingly, the support bracket 306 may comprise a front surface 306a and a rear surface 306b. The front surface 306a may be configured to connect to the PCB 28 through the heat sink 26, and the rear surface 306b may be directed toward the windshield via the ball adaptor 326. The support bracket 306 is shown in connection with the slider component 332, the toggle switch 304, and the rotational damper 308.

The support bracket 306 may form a first mechanical stop 380 configured to limit a first motion 382 of the toggle switch 304 when adjusted to the first position 360. The support bracket 306 may also form a second mechanical stop 386 configured to limit a second motion 388 of the toggle switch 304 when adjusted to the second position 362 (shown in FIG. 10A). The toggle switch 304 may be configured to contact each of the mechanical stops 380 and 386 via a first interface surface 304a and a second interface surface 304b, respectively. In this configuration, the first interface surface 304a may be arranged proximate the first mechanical stop 380 in the first position 360, and the second interface surface 304b may be arranged proximate the second mechanical stop 386 in the second position 362.

Each of the first interface surface 304a and the second interface surface 304b may comprise a bumper 390. Each of the bumpers 390 may correspond to cushioning material attached to the toggle switch 304 and/or the support bracket 306. The bumpers 390 may provide for an improved interaction with the actuator assembly 300 by limiting an impact and associated noise that may otherwise occur when adjusting the toggle switch 304 from the first position 360 to the second position 362. In an exemplary embodiment, the bumpers 390 may correspond to an overmolded portion applied to the each of the interface surfaces 304a and 304b. In this configuration, the bumpers 390 may cushion an impact of the toggle switch 304 with the support bracket 306 to improve the transition of the actuator assembly 300 from the first position 360 to the second position 362.

Referring now to FIG. 11B, a detailed assembly view of the slider component 332, the toggle switch 304, and the rotational damper 308 are shown. A first bumper 390a disposed on the first interface surface 304a. The first bumper 390a may correspond to a protrusion of a material dissimilar to a base structure forming the toggle switch 304. The protrusion may comprise one or more features 394 disposed on an impact surface 396, which may be configured to improve a cushioning or decelerating property of the first bumper 390a. In an exemplary embodiment, the first bumper 390a may correspond to an elastomeric material overmolded on an exterior surface of a rigid polymeric material of the toggle switch 304.

Also demonstrated in FIG. 11B and 11C, the radial positioning feature 398 may be configured to delay a mechanical engagement of a coupler 400 of the toggle switch 304 with a radial positioner 402 of the rotational damper 308. In this configuration, the radial positioner 402 may protrude from the damped cylinder 322 and only engage the coupler 400 of the toggle switch 304 after the first motion 382 or the second motion 388 of the toggle switch 304 relative to the rotational damper 308. Accordingly, the rotational motion of the toggle switch 304 may not be damped significantly by the rotational damper 308 until the toggle switch 304 has rotated axially through a rotational buffer 404.

In some embodiments, the rotational buffer 404 may correspond to a disengagement zone between the toggle switch 304 and the rotational damper 308. The rotational buffer 404 may allow for each of a first engaging surface 400a and a second engaging surface 400b of the coupler 400 to travel radially in relation to the radial positioner 402 and the damped cylinder 322 of the rotational damper 308. Over the portion of the radial travel corresponding to the rotational buffer 404, the rotation of the toggle switch 304 may be undamped by the rotational damper 308. The rotational buffer 404 may correspond to a radial distance 406, which may be approximately greater than one-half of a radial travel of the toggle switch 304. In an exemplary embodiment, the radial distance 406 of the rotational buffer 404 may be approximately 75% of the radial travel of the toggle switch. Accordingly, the rotational damper 308 may not inhibit the rotation of the toggle switch 304 until the toggle switch 304 has rotated approximately past a center of travel.

Figures 10A, 10B:
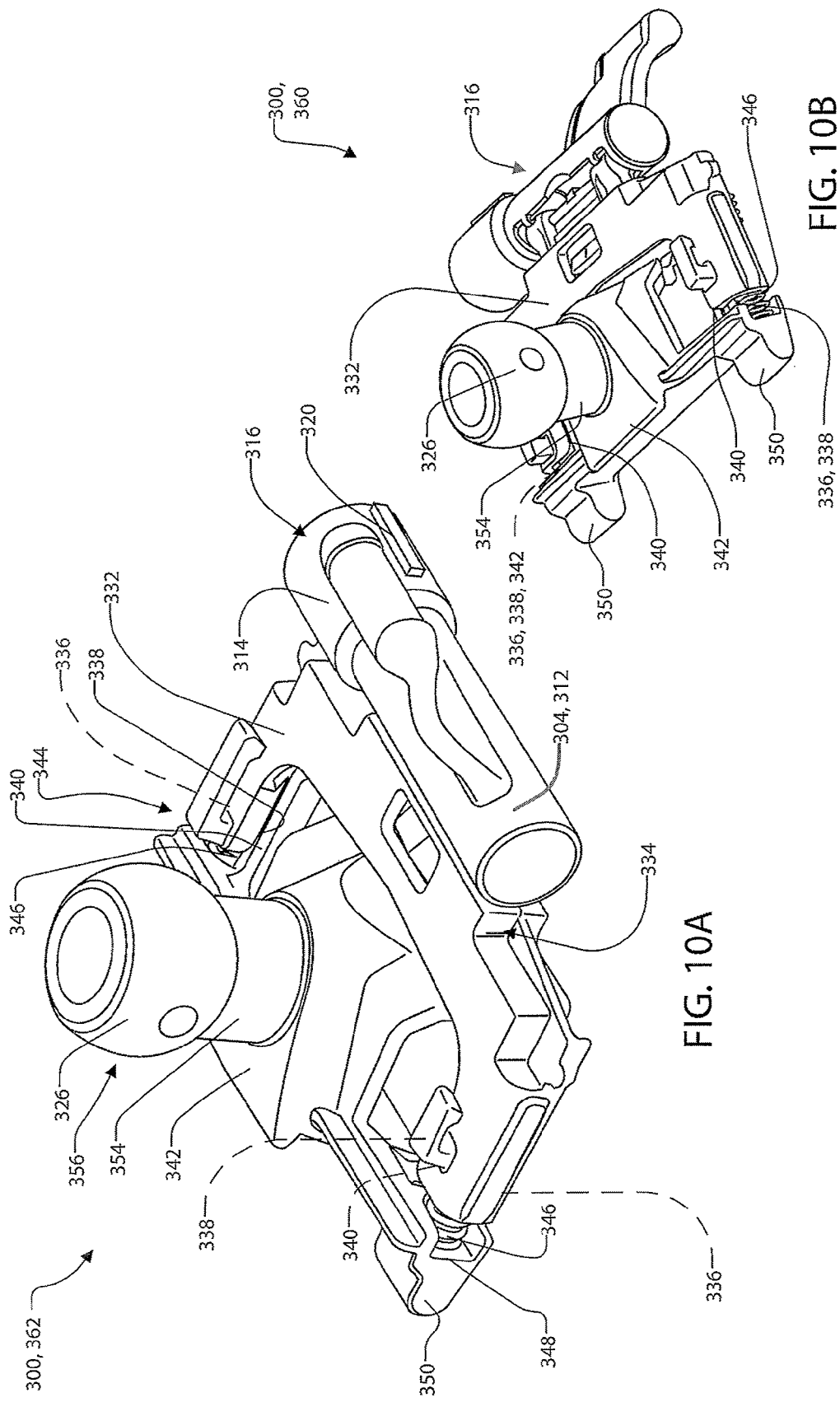
FIG. 10A is a projected view of a partial assembly of the actuator assembly demonstrated in FIG. 9A.
FIG. 10B is a projected view of a partial assembly of the actuator assembly demonstrated in FIG. 9A.

The center of travel may be located radially approximately halfway between the first position 360 and the second position 362 (shown in FIG. 10A). In this configuration, the toggle switch 304 may be less likely to stall or catch between the first position 360 and the second position 362. Accordingly, the rotational buffer 404 may provide for an improved consistency and feel when moving the toggle switch 304 between the first position 360 and the second position 362. Though discussed in reference to the exemplary embodiment shown in FIGS. 11B and 11c, the elements of the actuator assembly 300 may be configured in various arrangements without departing from the spirit of the disclosure.

In some embodiments, the rotational buffer 404 or the disengagement zone of the toggle switch 304 may form a channel 408 configured to slideably engage the radial positioner 402. The first engaging surface 400a and the second engaging surface 400b of the coupler 400 may form the radial extents of the channel 408. In some embodiments, the channel 408 may comprise a coating 410 of a material dissimilar to that of the toggle switch 304. Similar to the bumper 390, the coating 410 may be configured to improve a cushioning and/or avoid interference between the channel 408 of the coupler 400 and the radial positioner 402 of the rotational damper 308. In an exemplary embodiment, the coating 410 may correspond to an elastomeric material overmolded along a length of the channel 408 extending from the first engaging surface 400a to the second engaging surface 400b.

Referring now to FIG. 12B, an exploded assembly view of the actuator assembly 300 is shown. The exploded assembly view may demonstrate the support bracket 306, slider component 332, the toggle switch 304, and the rotational damper 308. As demonstrated, the second interface surface 304b may also comprise a bumper 390. Accordingly, a second bumper 390b may be disposed on the second interface surface 304b of the toggle switch 304.

The second bumper 390b may correspond to a protrusion of a material dissimilar to a base structure forming the toggle switch 304. The protrusion may comprise one or more features 394 disposed on the impact surface 396. The features 394 may be configured to improve a cushioning or decelerating property of the second bumper 390b. In an exemplary embodiment, the second bumper 390b may correspond to an elastomeric material overmolded on an exterior surface of a rigid polymeric material of the toggle switch 304. In this configuration, the second bumper 390b may provide for an improved interaction with the actuator assembly 300 by limiting an impact when adjusting the toggle switch 304 from the first position 360 to the second position 362.

Further demonstrated in FIG. 12B, the engaging surface 314 of the locating feature 320 of the rotational damper 308 is shown as well as a complementary receiving aperture 420 formed in the first channel 318. In this assembled configuration, the engaging portion 312 of the toggle switch 304 may engage the rotational damper 308 such that the toggle switch 304 and the damped cylinder 322 within of the rotational damper 308 rotate together about the first pivotal axis 310. Accordingly, a rotation of the toggle switch 304 and the damped cylinder 322 may be locked such that the rotation of the toggle switch 304 is damped about the first pivotal axis 310 by the rotational damper 308 relative to the support bracket 306.

To provide information to the viewer of the display mirror assembly 10, the display mirror assembly 10 may include information regarding the field of view 178, such as a partially transmissive graphic overlay or an image on the display 22 visible on the viewing area 40 when the display mirror assembly 10 is in use.

Referring again to FIGS. 5 and 6, the display mirror assembly discussed herein, may comprise one or more conductive clips. In order to construct the display mirror assembly 10 described herein, the J-clips 54 are installed on the glass element 12, and then element wires are soldered to the top portion of the J-clips 54. The glass element 12 is then secured to the front side 64 of the front shield 14, using the foam adhesive 72 and the forward retaining features 70 of the front shield 14. The front shield 14 is then inverted, with the glass element 12 facing downwardly on a protective surface.

A first subassembly 180 (FIG. 5), including the display 22 and optic block 24, may be assembled by snap-fitting the glare sensor 102 into the receiving aperture 104 in the optic block 24, and adhering the display 22 to the optic block 24. The adhesion of the display 22 and optic block 24 may include coating the front side 90 of the optic block 24 with an adhesive and applying a release liner over the adhesive, wherein the release liner is easily removable from the adhesive. When it is time to assemble the display 22 and optic block 24, the release liner is removed, and the display 22 is positioned on the front side 112 of the optic block 24. To position the display 22, one edge of the display 22 is aligned in the appropriate location on the optic block 24, and then the display 22 is rotated into contact with the front side 90 of the optic block 24. The first subassembly 180 is placed in position on the rear side 66 of the front shield 14. The tabs 96 extending outwardly from the optic block 24 are inserted through the holes 76 in the rearwardly directed tabs 74 of the front shield 14.

A second subassembly 182 (FIG. 5), including the heat sink 26 and edge lit PCB 120, is assembled. To assemble the second subassembly 182, the gap filler 122 is adhered to the edge lit PCB 120. The adhesion may include coating one side of the gap filler 122 with adhesive and then applying the gap filler 122 to the edge lit PCB 120 so that it does not interfere with the operable side of the edge lit PCB 120. The gap filler 122 and edge lit PCB 120 are then inserted into the opening in the channel 116 on the front side 112 of the heat sink 26. Locating features are optionally provided on the heat sink 26, the edge lit PCB 120 or both, to aid in inserting the side lit PCB and gap filler 122 into the channel 116. The second subassembly 182 is placed in position on the rear side 92 of the optic block 24. The screw-receiving elements 98 extending rearwardly from the optic block 24 extend through the holes 130 in the heat sink 26.

The primary PCB 28 may be placed above the top edge of the second subassembly 182, with the front side 140 facing upwards. The flexible electrical connector 80 from the display 22 is mated with the electrical connector therefor. The primary PCB 28 is then rotated 180 degrees about the top edge of the second subassembly 182, so that the front side 140 is in contact with the heat sink 26. When rotating the primary PCB 28, the flexible electric connector is wrapped over the top edge of at least a portion of the display module 18. The element wires are electrically connected with the electrical connectors therefor, and the wiring harness for the edge lit PCB 120 is connected with the electrical connector therefor.

As shown in FIGS. 4-5, the rear shield 16 is placed over the primary PCB 28, and the tabs 128 extending upwardly from the heat sink 26 are engaged with the slots 166 on the peripheral wall 164 of the rear shield 16. At least one screw 100 is inserted through the screw holes 168 in the rear shield 16, through the side cutouts 150 in the PCB, through the heat sink 26, and into the screw-receiving elements 98 on the optic block 24. It is desirable that two to three screws 100 are affixed in this manner.

The forwardly directed cavity 170 of the rear housing 30 is placed over the rear shield 16, and the mechanically engaging features 172 of the rear housing 30 are snap fit to engage with the corresponding engagement feature 174 of the heat sink 26. The mounting member 32 may be installed in the rear housing 30 prior to assembly.

The present disclosure may be used with a mounting system such as that described in U.S. Pat. Nos. 8,814,373; 8,201,800; 8,210,695; 8,960,629; 9,174,577; 8,925,891; 9,244,249; and 9,838,653; and U.S. Provisional Patent Application No. 61/704,869, which are hereby incorporated herein by reference in their entirety. Further, the present disclosure may be used with a rearview packaging assembly such as that described in U.S. Pat. Nos. 8,814,373; 8,646,924; 8,643,931; 8,264,761; 8,885,240; and 9,316,347; and U.S. Provisional Patent Application No. 61/707,625, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety.

It will be appreciated that embodiments of the invention described herein may be comprised of one or more conventional processors and unique stored program instructions that control one or more processors to implement, in conjunction with certain non-processor circuits, some, most, or all of the functions of a display mirror assembly 10, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An actuator assembly configured to adjust a viewing axis of a vehicle mirror, the assembly comprising:
   a toggle switch;
   a pivot plate rotationally coupled to the toggle switch proximate a first axis; and
   a support bracket rotationally coupled to the pivot plate along a second axis and rotationally coupled to the toggle switch along the first axis, wherein the support bracket is configured to support the vehicle mirror, and wherein a rotation of the toggle switch is configured to move the pivot plate relative to the support bracket to adjust a viewing angle of the vehicle mirror.

2. The actuator assembly according to claim 1, wherein the pivot plate is in connection with a mounting assembly configured to mount the vehicle mirror to a portion of a vehicle.

3. The actuator assembly according to claim 1, wherein the pivot plate forms a spring loaded assembly configured to restrict the rotation of the toggle switch about the first axis.

4. The actuator assembly according to claim 1, further comprising an engaging member configured to couple the toggle switch to the pivot plate proximate the first axis.

5. The actuator assembly according to claim 4, wherein the engaging member is rotationally coupled to the toggle switch in an offset configuration.

6. The actuator assembly according to claim 5, wherein the engaging member is configured to translate concentrically about the first axis in response to the rotation of the toggle switch.

7. The actuator assembly according to claim 6, wherein the translation of the engaging member causes a rotation of the pivot plate about the second axis relative the support bracket, thereby adjusting the viewing angle of the vehicle mirror.

8. The actuator assembly according to claim 7, wherein the pivot plate comprises an engaging feature configured to selectively activate a sensor of the vehicle mirror in response to the rotation of the pivot plate.

9. The actuator assembly according to claim 1, further comprising a damper coupled to the toggle switch and the support bracket.

10. The actuator assembly according to claim 9, wherein the damper is configured to dampen a rotation of the toggle switch about the first axis relative to the support bracket.

11. A mirror assembly for a vehicle, comprising:
    a housing;
    a glass element operably coupled with the housing;
    an actuator device disposed in connection with the housing and operably coupled with the glass element, wherein the actuator device is adjustable to tilt the glass element to a first position and a second position; and
    a damper in engagement with the actuator device and the housing, wherein the damper controls a movement of the actuator device corresponding to the movement of the glass element from the first position to the second position.

12. The mirror assembly according to claim 11, wherein the first position corresponds to an off-axis position relative to a rearward reflected view and the second position corresponds to an on-axis position relative to the rearward reflected view.

13. The mirror assembly according to claim 11, further comprising a display module mounted between the glass element and the housing.

14. The mirror assembly according to claim 13, wherein the display module is configured to be controlled to an on state and an off state.

15. The mirror assembly according to claim 14, wherein the actuator device is further configured to control the display module to an on-state in the first position and an off-state in the second position.

16. The mirror assembly according to claim 11, wherein the damper corresponds to a rotational damper.

17. A mirror assembly for a vehicle, comprising:
    a support bracket;
    a glass element operably coupled with the support bracket;

an actuator assembly disposed in connection with the support bracket, wherein the actuator assembly is adjustable to tilt the glass element to a first position and to a second position;

a damper in engagement with the actuator assembly and the support bracket over a first portion of an actuation range, wherein the damper controls a movement of the actuator assembly corresponding to the movement of the glass element from the first position to the second position; and a sensor configured to detect a position of the actuator assembly.

18. The mirror assembly according to claim 17, wherein the engagement of the damper with the actuator assembly over the first portion of the actuation range is controlled via a rotational buffer.

19. The mirror assembly according to claim 17, wherein the actuator assembly is undamped by the damper over a radial distance corresponding to a second portion of the actuation range.

20. The mirror assembly according to claim 17, wherein the first portion and the second portion each correspond to approximately half of the actuation range of the actuator assembly.

* * * * *